(12) United States Patent
Zou et al.

(10) Patent No.: US 11,835,489 B2
(45) Date of Patent: Dec. 5, 2023

(54) ACOUSTIC GARBAGE CLASSIFICATION METHOD USING ONE-DIMENSIONAL CONVOLUTIONAL NEURAL NETWORK (1D-CNN)

(71) Applicant: ZHEJIANG UNIVERSITY, Hangzhou (CN)

(72) Inventors: Jun Zou, Hangzhou (CN); Gang Lu, Hangzhou (CN); Yuanbin Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 146 days.

(21) Appl. No.: 17/640,340

(22) PCT Filed: Nov. 18, 2020

(86) PCT No.: PCT/CN2020/129658
§ 371 (c)(1),
(2) Date: Mar. 4, 2022

(87) PCT Pub. No.: WO2021/129236
PCT Pub. Date: Jul. 1, 2021

(65) Prior Publication Data
US 2022/0349861 A1 Nov. 3, 2022

(30) Foreign Application Priority Data
Dec. 24, 2019 (CN) .......................... 201911347540.6

(51) Int. Cl.
*G01N 29/44* (2006.01)
*G01N 29/04* (2006.01)
*H04R 1/08* (2006.01)

(52) U.S. Cl.
CPC ......... *G01N 29/4481* (2013.01); *G01N 29/04* (2013.01); *G01N 29/4454* (2013.01); *H04R 1/08* (2013.01)

(58) Field of Classification Search
CPC ...... H04R 1/08; G01N 29/4481; G01N 29/04; G01N 29/4454; B07C 5/34; B07C 5/361
(Continued)

(56) References Cited

FOREIGN PATENT DOCUMENTS

| CN | 110427896 A | 11/2019 |
|----|-------------|---------|
| CN | 110937280 A | 3/2020 |

(Continued)

OTHER PUBLICATIONS

Liu Qiang, et al., Research on Classification Methods for Marine Life Rubbish Based on Cepstrum and BP Network, Journal of Nantong Vocational & Technical Shipping College, 2016, pp. 34-38, vol. 15, No. 1.

*Primary Examiner* — Paul Kim
(74) *Attorney, Agent, or Firm* — Bayramoglu Law Offices LLC

(57) ABSTRACT

An acoustic garbage classification method using a one-dimensional convolutional neural network (1D-CNN) is provided. The method includes: acquiring sound signals generated by falling garbage; preprocessing the sound signals; acquiring and preprocessing the sound signals of different types of garbage, building a sound database for garbage classification, and establishing and training a 1D-CNN model; acquiring a sound signal of garbage to be classified, and inputting the sound signal into the trained 1D-CNN for garbage classification to obtain a classification result. The present disclosure is helpful to assist people in accurate garbage classification, improves the accuracy of garbage classification and recycling, and has high practical and popularization value.

1 Claim, 2 Drawing Sheets

(58) Field of Classification Search
USPC .......................................................... 381/56
See application file for complete search history.

(56) References Cited

FOREIGN PATENT DOCUMENTS

| | | | | |
|---|---|---|---|---|
| CN | 111160438 A | | 5/2020 | |
| EP | 1405706 A1 | | 4/2004 | |
| KR | 20190071387 A | * | 6/2019 | ............... B07C 5/34 |
| KR | 20190071387 A | | 6/2019 | |

* cited by examiner

ACOUSTIC GARBAGE CLASSIFICATION METHOD USING ONE-DIMENSIONAL CONVOLUTIONAL NEURAL NETWORK (1D-CNN)

CROSS REFERENCE TO THE RELATED APPLICATIONS

This application is the national phase entry of International Application No. PCT/CN2020/129658, filed on Nov. 18, 2020, which is based upon and claims priority to Chinese Patent Application No. 201911347540.6, filed on Dec. 24, 2019, the entire contents of which are incorporated herein by reference.

TECHNICAL FIELD

The present disclosure relates to a garbage classification method, and in particular to an acoustic garbage classification method using a one-dimensional convolutional neural network (1D-CNN).

BACKGROUND

Due to the rapid development of population, urbanization and economy, the rapid increase of municipal solid garbage has brought great challenges to the management of municipal solid garbage. The management of municipal solid garbage involves garbage generation, source separation, storage, collection, transportation and treatment of garbage. The source separation of garbage is a crucial step, and the quality of separation directly determines the subsequent garbage treatment. Currently, most automatic classification technologies are used for batch and large-scale classification in garbage treatment plants. Effective source separation technology is still lacking.

At present, it mainly relies on people to consciously separate garbage according to their knowledge of garbage classification, and it requires a lot of time and money on garbage classification education and supervision. In many developing countries, it is unrealistic to let people form the habit of garbage classification in a short period of time. Therefore, it is urgent to develop a source separation technology to help people class garbage in their daily lives. Image recognition technology has been widely used in garbage classification. However, each type of garbage varies in terms of color and shape and may be mixed with other substances, etc., which poses a great challenge to prepare adequate and unbiased datasets for image classification model training. Unlike images, sound is highly correlated with material properties, and classifying garbage by sound is a good choice.

At present, there are mainly two acoustic classification methods. One method is to manually extract acoustic data features and perform classification through a shallow classifier, which is cumbersome and inaccurate. The other method is to convert 1D sound data into two-dimensional (2D) images and perform classification through a 2D-CNN, which is computationally complex and not real-time. In view of this, there is an urgent need for a 1D-CNN-based acoustic garbage classification method to realize quick, effective and real-time garbage classification, so as to improve the garbage recycling rate, and get rid of the predicament of being besieged by garbage.

SUMMARY

An objective of the present disclosure is to provide an acoustic garbage classification method using a 1D-CNN. The present disclosure utilizes sound for garbage identification and classification, solving the problem of difficulty in manual garbage classification in the process of source separation, and improving the accuracy of source separation.

The present disclosure adopts the following technical solution. As shown in FIG. 1, an acoustic garbage classification method using a 1D-CNN includes:

(A) acquiring sound signals generated by falling garbage;

(B) preprocessing the sound signals;

(C) acquiring and preprocessing the sound signals of different types of garbage, building a sound database for garbage classification, and establishing and training a 1D-CNN model; and (D) acquiring a sound signal of garbage to be classified, and inputting the sound signal into the trained 1D-CNN for garbage classification to obtain a classification result.

The present disclosure realizes accurate garbage classification through sound-based deep learning (DL), improves the accuracy of garbage classification and recycling, and has high practical and popularization value.

In step (A), the sound signals produced by the falling garbage are generated by an impact of the garbage freely falling to a plate, and are recorded by a single-channel microphone; the sound signals are sampled at a frequency of 44,100 Hz; and the above process is repeated many times for each type of garbage to acquire multiple sound signals.

In step (B), the preprocessing includes: intercepting each of the multiple sound signals for an effective duration of 120 ms, the effective duration of 120 ms starting from a peak of each of the multiple sound signals and ending at 120 ms backward. In this way, the intercepted sound signals cover the entire impact process, and redundant information in the sound signals can be removed.

In step (C), the 1D-CNN model includes an input layer, a convolutional layer, a pooling layer, a fully connected layer and an output layer; during training, the input layer is used to input preprocessed sound signals labeled with a garbage type; the convolutional layer performs a convolution operation and feature extraction on output data of the input layer; a rectified linear unit (ReLU) activation function is used to enhance a nonlinear performance of the 1D-CNN; a max pooling layer performs feature dimensionality reduction, network parameter reduction and overfitting; and the fully connected layer and the output layer respectively perform classification and output a classification result.

In step (C), during the training of the 1D-CNN model, the selection of different hyperparameters affects the classification performance of the network. The present disclosure considers three hyperparameters: network depth, kernel size and learning rate. Considering the training time, computational complexity and computer configuration issues, only five empirical values are selected for each parameter. The optimal combination of three parameter values is obtained by an orthogonal experiment method, which optimizes the classification performance of the 1D-CNN model.

The present disclosure has the following beneficial effects:

(1) The present disclosure creatively uses sound data for garbage classification. Sound is highly correlated with material properties, and sound signals can reveal the inherent properties of garbage, such as elasticity and internal friction. The elasticity affects the frequency at which sound is produced, and the internal friction determines how the sound produced decays over time, which provides differently shaped acoustic features for garbage classification. Meanwhile, acoustic garbage classification greatly reduces the dataset for training the model.

(2) The present disclosure adopts the orthogonal experiment method to study the influence of different hyperparameters on the classification performance of the 1D-CNN in the training process, and finally determines the optimal hyperparameter combination, such that the model can achieve the optimal classification performance.

(3) The present disclosure performs garbage classification through the 1D-CNN. The 1D-CNN is suitable for processing 1D signals, and can directly extract optimal features from raw data, avoiding the tediousness and suboptimal nature of manual feature extraction and the computational complexity of classification by a 2D-CNN, greatly improving classification accuracy. Meanwhile, 1D-CNN is suitable for real-time applications on mobile, low-power, low-memory devices.

DETAILED DESCRIPTION OF THE EMBODIMENTS

The present disclosure will be further described below with reference to the drawings and embodiments. The implementations of the present disclosure include but are not limited to the following embodiments.

The specific embodiments and implementations of the present disclosure are as follows.

In a specific implementation, a 1D-CNN model uses TensorFlow 1.9 as a DL framework. All algorithms are written in python 3.6. All programs are executed on a laptop with a GTX1050Ti graphics card, an $8^{th}$-generation Intel Core i5 processor and a 512 GB solid state drive (SSD).

Figure 1:
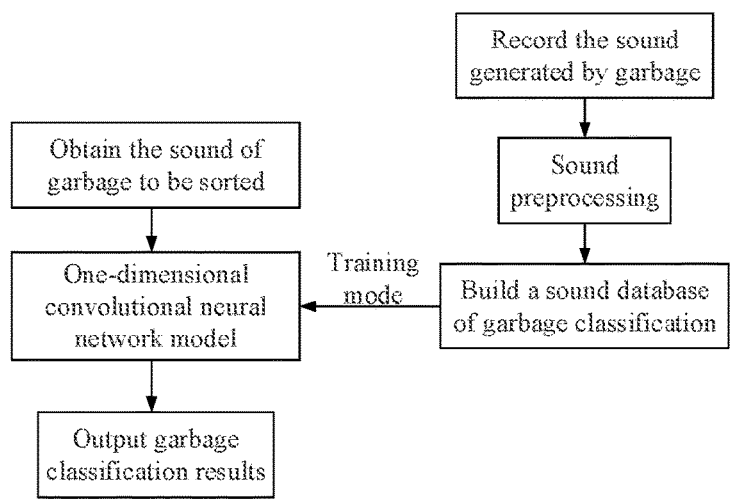
FIG. 1 is a flowchart of a method of the present disclosure.
Figure 2:
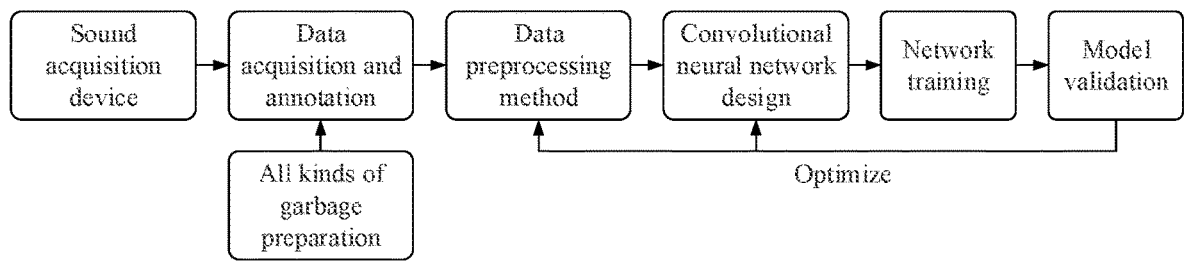
FIG. 2 is a schematic view of a CNN model for acoustic garbage classification.

As shown in FIG. 2, based on a sound acquisition device, various types of garbage materials are prepared. Garbage sound data is acquired, labeled and preprocessed. A simple and efficient network structure is designed to analyze the sound data. The network includes a large number of parameters, and an orthogonal experiment method is used to search for the optimal parameter combination. Orthogonal experiments are respectively implemented based on the following parameters: network depth: 1, 2, 3, 4 and 5; kernel size: 3, 5, 7, 9 and 11; and learning rate: 1e-5, 5e-5, 1e-4, 5e-4 and 1e-3. According to an orthogonal design table of six factors and five levels, 25 experiments are carried out, and the optimal parameter combination is finally obtained: network depth: 5; kernel size: 9; and learning rate: 5e-4.

Figure 3:
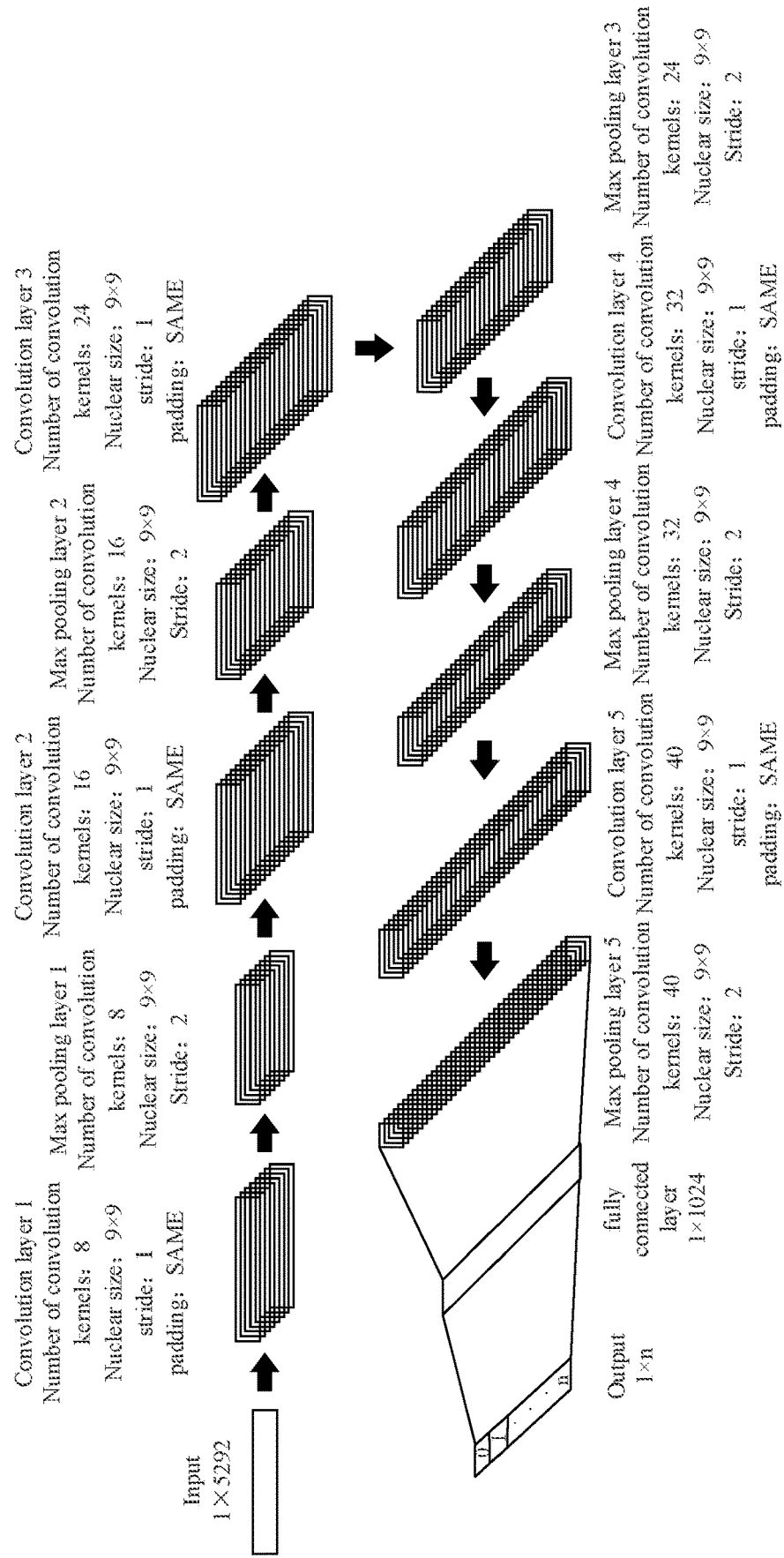
FIG. 3 is a schematic view of a 1D-CNN according to the present disclosure.

As shown in FIG. 3, in an embodiment, the 1D-CNN model includes an input layer, five convolutional layers, five pooling layers, a fully connected layer and an output layer. 1D sound signals are input to the input layer of the 1D-CNN. A convolution operation is performed between the input signals and a corresponding convolution kernel to generate an input feature map. The input feature map is transmitted through an activation function to generate an output feature map of the convolutional layers. The pooling layers are usually used after the convolutional layers, which reduce the computational cost by reducing the dimensionality of the features extracted from the convolutional layers, and provide basic translation invariance to the features.

In the embodiment, the 1D-CNN model is specifically designed as follows. The convolutional layers 1 to 5 are defined by the following parameters: number of convolution kernels: 8, 16, 24, 32 and 40; kernel size: 9×9; stride: 1; border padding: SAME: and activation function: ReLU function. The max pooling layers 1 to 5 are defined by the following parameters: number of convolution kernels: 8, 16, 24, 32 and 40; kernel size: 9×9: and stride: 2. Finally, the fully connected layer and the output layer are defined. A softmax function is used for classification, and a type label 0-n is output.

The model is trained and evaluated. The training process is mainly divided into two stages: forward propagation and backpropagation. Forward propagation is a calculation process of building the model and establishing a mapping relationship between input and output. Backpropagation is to use gradient descent to train model parameters to minimize a loss function. After a final model is obtained, the classification effect of the model is evaluated through a test set in a sound database.

(D) A sound signal of garbage to be classified is acquired, and the sound signal is into the trained 1D-CNN for garbage classification to obtain a classification result.

The above described are merely preferred implementations of the present disclosure, and the present disclosure is not limited thereto. All technical solutions that achieve the objective of the present disclosure by substantially the same means fall within the protection scope of the present disclosure.

What is claimed is:

1. An acoustic garbage classification method using a one-dimensional convolutional neural network (1D-CNN), comprising the following steps:
   (A) acquiring sound signals generated by falling garbage;
   (B) preprocessing the sound signals;
   (C) acquiring and preprocessing the sound signals of different types of garbage, building a sound database for a garbage classification, and establishing and training a 1D-CNN model; and
   (D) acquiring a sound signal of garbage to be classified, and inputting the sound signal of the garbage to be classified into a trained 1D-CNN model for the garbage classification to obtain a classification result;
   wherein in step (A), the sound signals produced by the falling garbage are generated by an impact of the falling garbage freely falling to a plate, and are recorded by a single-channel microphone; the sound signals are sampled at a frequency of 44,100 Hz; and the above process is repeated a plurality of times for each of different types of garbage to acquire multiple sound signals,
   wherein in step (B), the preprocessing comprises: intercepting each of the sound signals for an effective duration of 120 ms, the effective duration of 120 ms starts from a peak of each of the sound signals and ends at 120 ms backward, and
   wherein in step (C), the 1D-CNN model comprises an input layer, a convolutional layer, a pooling layer, a fully connected layer and an output layer; during a training of the 1D-CNN model, the input layer is used to input preprocessed sound signals labeled with a garbage type; the convolutional layer performs a convolution operation and a feature extraction on output data of the input layer; a rectified linear unit (ReLU) activation function is used to enhance a nonlinear performance of the 1D-CNN model; a max pooling layer performs a feature dimensionality reduction, a network parameter reduction and an overfitting; and the fully connected layer and the output layer respectively perform the garbage classification and output the classification result.

* * * * *